(12) United States Patent
Bai

(10) Patent No.: US 12,493,322 B2
(45) Date of Patent: Dec. 9, 2025

(54) DISPLAY MODULE, DISPLAY DEVICE, AND METHOD FOR PRODUCING DISPLAY MODULE

(71) Applicant: WUHAN TIANMA MICROELECTRONICS CO., LTD., Wuhan (CN)

(72) Inventor: Guangfeng Bai, Wuhan (CN)

(73) Assignee: WUHAN TIANMA MICROELECTRONICS CO., LTD., Wuhan (CN)

( * ) Notice: Subject to any disclaimer, the term of this patent is extended or adjusted under 35 U.S.C. 154(b) by 219 days.

(21) Appl. No.: 18/340,896

(22) Filed: Jun. 26, 2023

(65) Prior Publication Data
US 2023/0333602 A1    Oct. 19, 2023

(30) Foreign Application Priority Data
Mar. 27, 2023   (CN) .......................... 202310309569.5

(51) Int. Cl.
*G06F 1/16* (2006.01)
*B32B 3/04* (2006.01)
*G02F 1/1333* (2006.01)

(52) U.S. Cl.
CPC .............. *G06F 1/1652* (2013.01); *B32B 3/04* (2013.01); *B32B 2457/202* (2013.01); *G02F 1/133305* (2013.01)

(58) Field of Classification Search
CPC ...... H10K 77/10–111; G02F 1/133305; B32B 2457/20–208; B32B 3/04; G06F 1/1652
See application file for complete search history.

(56) References Cited

U.S. PATENT DOCUMENTS

| | | |
|---|---|---|
| 2010/0142222 A1 | 6/2010 | Vahabzadeh |
| 2021/0408501 A1 | 12/2021 | Yu et al. |
| 2024/0180003 A1 | 5/2024 | Li |

FOREIGN PATENT DOCUMENTS

| | | | |
|---|---|---|---|
| CN | 111063256 A | 4/2020 | |
| CN | 111740030 A | 10/2020 | |
| CN | 112164312 A | * 1/2021 | .......... H04M 1/0268 |
| CN | 114822285 A | 7/2022 | |
| CN | 115050793 A | 9/2022 | |
| CN | 115101574 A | 9/2022 | |
| CN | 115188908 A | 10/2022 | |
| CN | 115331548 A | 11/2022 | |

(Continued)

OTHER PUBLICATIONS

Office Action of Chinese Patent Application No. 202310309569.5 Mailed Apr. 24, 2024.

(Continued)

*Primary Examiner* — Mariceli Santiago
(74) *Attorney, Agent, or Firm* — KILPATRICK TOWNSEND & STOCKTON LLP

(57) ABSTRACT

A display module, a display device and a method for producing a display module are provided. The display module includes a first part, a second part and a bending part connected between the first part and the second part, where the bending part is bendable to bring the second part to a side of the first part in a thickness direction. The ink layer is arranged on a side of the display panel, and the ink layer covers at least a portion of the first part and at least a portion of the bending part.

8 Claims, 19 Drawing Sheets

(56) References Cited

FOREIGN PATENT DOCUMENTS

| | | | | |
|---|---|---|---|---|
| CN | 115472092 | A | 12/2022 | |
| EP | 3637744 | A1 * | 4/2020 | ............... G02B 1/14 |
| JP | 7100331 | B1 | 7/2022 | |

OTHER PUBLICATIONS

Office Action of Chinese Patent Application No. 202310309569.5 Mailed Aug. 14, 2024.

* cited by examiner

DISPLAY MODULE, DISPLAY DEVICE, AND METHOD FOR PRODUCING DISPLAY MODULE

This application claims priority to Chinese Patent Application No. 202310309569.5, titled "DISPLAY MODULE, DISPLAY DEVICE, AND METHOD FOR PRODUCING DISPLAY MODULE", filed on Mar. 27, 2023 with the China National Intellectual Property Administration, which is hereby incorporated by reference in its entirety.

FIELD

The present disclosure relates to the technology field of display equipment, and more particularly, to a display module, a display device and a method for producing the display module.

BACKGROUND

With the development of science and technology, display devices have been developed according to higher and higher requirements of people. Narrow border display devices have gained more and more attention because of the advantage of large screen-to-body ratio. However, the existing narrow border display devices still have the problem of low production yield.

SUMMARY

In view of this, a display module, a display device and a method for producing the display module are provided in the present disclosure, to improve the production yield.

In one embodiment of a display module is provided, including a first part, a second part and a bending part connected between the first part and the second part, where the bending part is bendable to bring the second part to a side of the first part in a thickness direction.

The ink layer is arranged on a side of the display panel, and the ink layer covers at least a portion of the first part and at least a portion of the bending part.

In one embodiment of a method for producing a display module is provided, including:
  providing an initial substrate, where the initial substrate includes a first zone, a third zone, and a second zone sequentially arranged side by side in a first direction;
  forming an ink layer on the first zone and the third zone of the initial substrate;
  forming a polarizing layer on the ink layer on the first zone of the initial substrate;
  forming a first support part on the first zone of the initial substrate, where the first support part is on a side of the initial substrate away from the ink layer, the first support part has a first edge close to a side of the third zone in the first direction, the polarizing layer has a second edge close to the side of the third zone in the first direction, and a distance between the first edge and the second edge in the first direction is D, where $D \leq 0.3$ mm; and
  soldering a driver chip to the second zone of the initial substrate.

In the embodiments of the display module, the display device and the method for producing the display module as provided in the present disclosure, the ink layer covers at least a portion of the first part and at least a portion of the bending part, and the ink layer can protect the bending part, to eliminate the need for BPL adhesive on the bending part, and thus simplifying the producing process. Furthermore, the ink layer can be formed through micro nozzle printing. Compared with BPL adhesive, the ink layer can have higher preparation accuracy, to ensure the protection of the bending part while reducing adverse effects on the producing process of display modules and improving the production yield of display modules.

BRIEF DESCRIPTION OF THE DRAWINGS

In order to provide a clear description of the embodiments of the present disclosure, a brief introduction of accompanying drawings illustrating the embodiments of the present disclosure.

REFERENCE SIGNS

10, Display panel; 11, First part; 12, Second part; 13, Bending part;
20, Ink layer; 21, First ink part; 22, Second ink part; 221, First segment; 222, Hollow; 223, Groove; 23, Third ink part;
30, Polarization layer;
40, Support layer; 41, First support part; 42, Second support part;
50, Optical functional layer; 51, First optical part; 511, Limiting channel; 52, Second optical part;
60, Sacrificial part; 61, Sacrificial channel;
70, BPL adhesive;
10', Initial substrate; 11', First zone; 12', Second zone; 13', Third zone;
IC, Driver chip;
E1, First edge; E2, Second edge;
M1, First surface;
X, First direction; Y, Second direction; Z, Thickness direction.

DETAILED DESCRIPTION OF EMBODIMENTS

The embodiments of the present disclosure are described in detail below. The present disclosure is described in detail in conjunction with the drawings and the embodiments. The present disclosure may be implemented without some of these specific details. The following description of the embodiments is only intended to provide a better understanding for the present disclosure by illustrating embodiments of the present disclosure.

It should be noted that the relational terms "first", "second" and the like in the description are used for distinguishing an entity or operation from another entity or operation, but not intended to require or imply an actual relationship or order between these entities or operations. Further, the terms "include", "comprise" or any variant thereof are intended to encompass nonexclusive inclusion and a process, method, article or device including a series of elements includes not only those elements but also other elements which have not been listed definitely or an element(s) inherent to the process, method, article or device. Unless expressively limited otherwise, the statement "comprising (including) one . . . " does not exclude the case that other similar elements may exist in the process, method, article or device.

In the producing process of a display device, some structures in the display panel are usually bent to the backlight side of the display device, to reduce the occupation ratio of these structures and achieving a narrow border.

Figure 1:
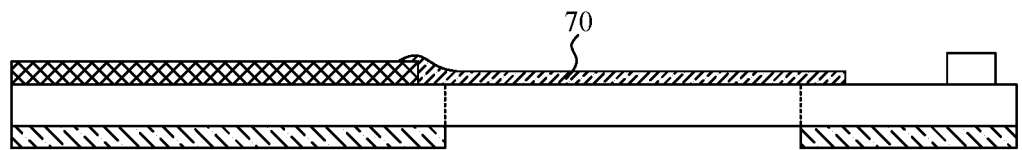
FIG. 1 is a cross-sectional view of a display module in a flattened state in related technologies.

In related technologies, as shown in FIG. 1, BPL adhesive 70 (bending protection layer) is normally arranged on the structure to be bent in the display panel, to reduce bending stress. However, it is found that the amount and position accuracy of BPL adhesive 70 have an impact on the sealing effect. For example, when the BPL adhesive 70 is not enough, it cannot provide good protection, and the display panel may crack when being bent, which is disadvantage in use of the display device. When BPL adhesive 70 is too much, there is a risk that the BPL adhesive 70 covers another layer, which is disadvantage in subsequent producing processes.

Figure 2:
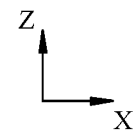
FIG. 2 is a cross-sectional view of a display module in a flattened state according to an embodiment of the present disclosure.
Figure 2:
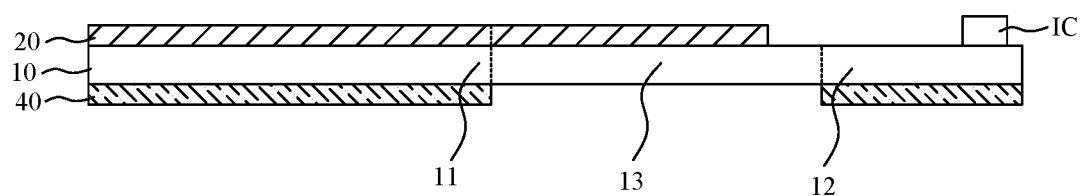
Figure 3:
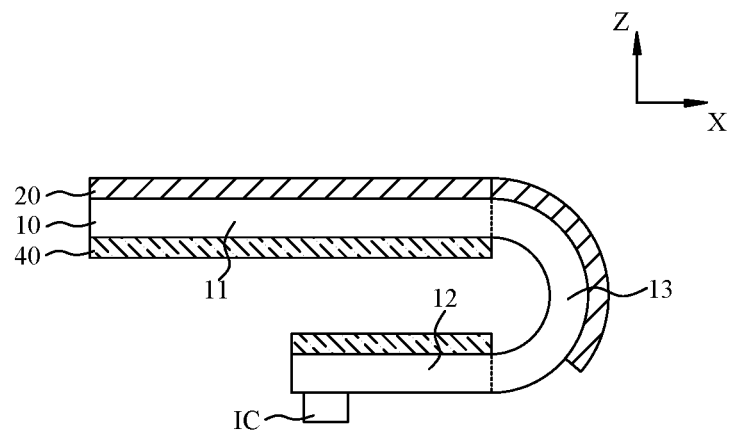
FIG. 3 is a cross-sectional view of a display module in a bent state according to an embodiment of the present disclosure.

In view of above, referring to FIGS. 2 and 3, a display module is provided according to an embodiment of the present disclosure, including a display panel 10 and an ink layer 20. The display panel 10 includes a first part 11, a second part 12 and a bending part 13 connected between the first part and the second part. The bending part 13 is bendable to bring the second part 12 to a side of the first part 11 in a thickness direction Z.

The ink layer 20 is arranged on a side of the display panel 10, and covers at least a portion of the first part 11 and at least a portion the bending part 13.

The display panel 10 may be an important part of the display module. The display panel 10 usually includes multiple stacked layers. The specific layered structure of the display panel 10 is not limited in the present disclosure. For example, the display panel 10 includes an array layer, an emitting layer, and a packaging layer which are stacked.

The display panel 10 includes the first part 11, the bending part 13, and the second part 12 arranged in sequence. The display module includes at least two states: a flattened state and a bent state. FIG. 1 shows the structural schematic diagram of the display module in the flattened state, and FIG. 2 shows the structural schematic diagram of the display module in the bent state. During the transition of the display module from the flattened state to the bent state, the second part 12 in the display panel 10 is moved through the bending part 13 to one side of the first part 11 in the thickness direction Z. That is, in the bent state, the first part 11 and the second part 12 are arranged side by side in the thickness direction Z.

The first part 11 includes a structure that provides a display effect of the display panel 10. In the bent state, the surface of the first part 11 that is away from the second part 12 is the light emitting surface of the first part 11, which is used to display an image or video to the user.

The second part 12 is connected to the first part 11 through the bending part 13. For example, control components such as the driver chip IC can be arranged on the second part 12. The driver chip IC may include chips of various types, such as a display driver chip and a control driver chip. The display driver chip is used to store image data, generate driving voltage, and may provide other functions through customized algorithms, such as functions for improving image quality. The touch driver chip is mainly used for touch signal processing, which is a necessary component of a display device having a touch function. The display driver chip and the touch driver chip may be integrated and arranged on the second part 12.

The ink layer 20 is arranged on a side of the display panel 10. That is, in the flattened state, the ink layer 20 is located on a side of the display panel 10 in the thickness direction Z. The ink layer 20 covers at least a portion of the first part 11, that is, the ink layer 20 may cover only a portion of the first part 11, or the ink layer 20 may cover all the first part 11. Similarly, the ink layer 20 covers at least a portion of the bending part 13. That is, the ink layer 20 may cover only a portion of the bending part 13, or the ink layer 20 may cover all of the bending part 13.

In related technologies, the ink layer 20 is usually arranged only on the first part 11. That is, the bending part 13 is usually not arranged with the ink layer 20. The embodiment of the present disclosure extends the ink layer 20 from the first part 11 to the bending part 13, and the ink layer 20 covers at least part of the first part 11 and at least part of the bending part 13. During the transition from the flattened state to the bent state, the ink layer 20 located on the bending part 13 can protect the bending part 13. The ink layer 20 can replace the BPL adhesive, to reduce the risk of cracks on display panel 10. Therefore, BPL adhesive needs not to be arranged on the bending part 13.

In summary, the embodiment of the present disclosure uses the ink layer 20 to cover at least part of the first part 11 and at least part of the bending part 13, and the ink layer 20 can protect the bending part 13, to eliminate the need for BPL adhesive on the bending part 13, simplifying the producing process. Furthermore, the ink layer 20 can be formed through micro nozzle printing. Compared with BPL adhesive, the ink layer 20 have higher preparation accuracy, to ensure the protection of the bending part 13 while reducing adverse effects on the producing process of the display module, and thus improving the production yield of the display module.

In addition, in general, the thickness of BPL adhesive also results in an increase of border size of the display module in the bent state. The embodiment of the present disclosure uses the ink layer 20 to replace BPL adhesive on the bending part 13, and the border size of the display module is reduced in the bent state because the thickness of ink layer 20 is usually smaller than that of the BPL adhesive, to improve the display effect.

The structure used to cover and protect the bending part 13 needs to meet some modulus requirements to provide bending protection. In related technologies, because the modulus of BPL adhesive can meet the modulus requirements, the BPL adhesive is provided on the bending part 13 to protect the bending part 13 during the bending process. In the embodiment of the present disclosure, the modulus of the ink layer 20 is usually greater than that of the BPL adhesive, and the ink layer 20 can be used to replace the BPL adhesive. Compared with the BPL adhesive, the thickness of the ink layer 20 required for providing the protection of the bending part 13 is smaller, to reduce the border size of the display module in the bent state.

It should be noted that the emitting method of the display panel 10 is not limited in the present disclosure. For example, the display panel 10 may achieve a display effect by driving liquid crystals to deflect, or by using organic light-emitting elements.

Figure 4:
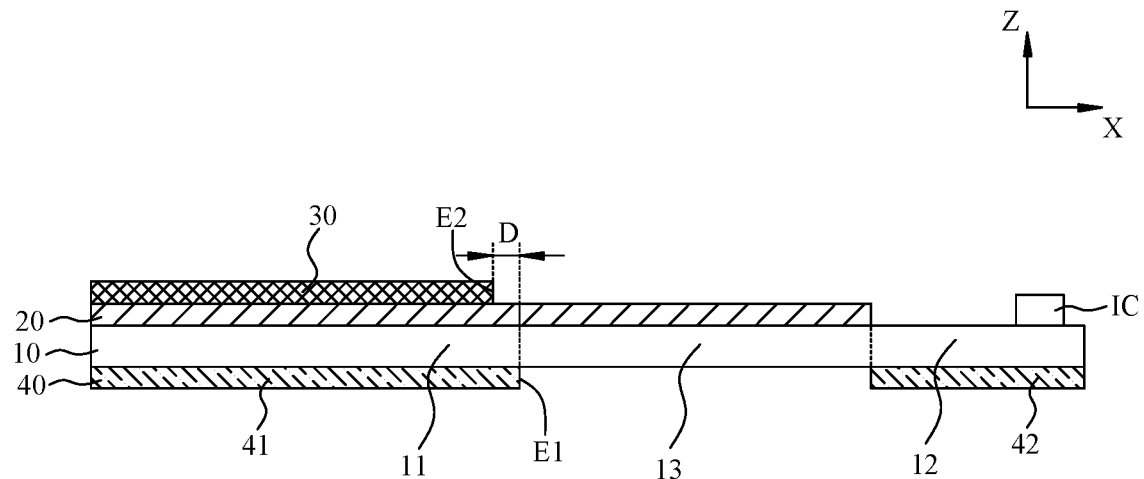
FIG. 4 is a cross-sectional view of a display module in a flattened state according to an embodiment of the present disclosure.
Figure 5:
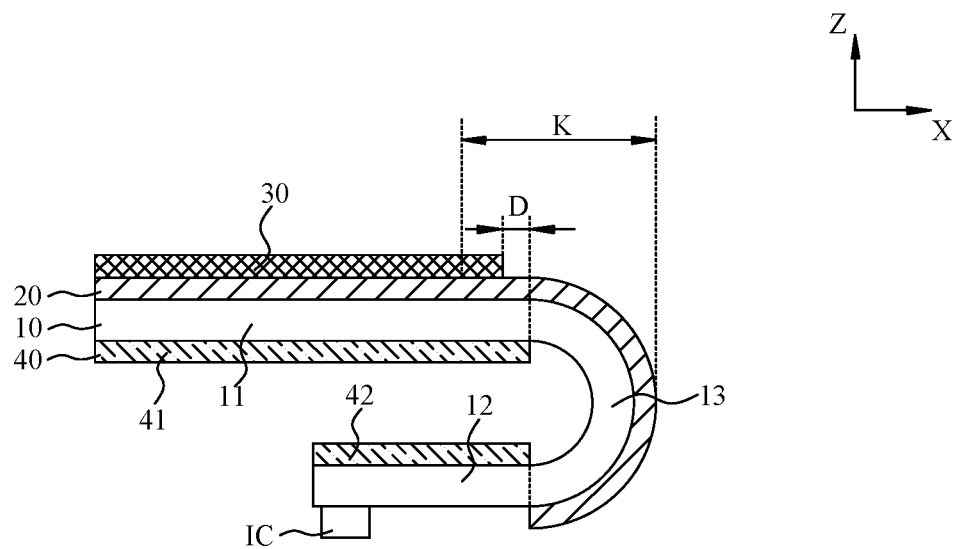
FIG. 5 is a cross-sectional view of a display module in a bent state according to an embodiment of the present disclosure.

In some embodiments, referring to FIGS. 4 and 5, the display module further includes a polarizing layer 30 located on a side of the first part 11 in the thickness direction Z, and the polarizing layer 30 is located on the side of the ink layer 20 away from the display panel 10.

The polarizing layer 30 is used to control light that vibrates in a specific direction to pass, to reduce the impact of reflected light on the display effect. In one embodiment, for a liquid crystal display panel 10, the polarizing layer 30 may control the light emitted by the display panel 10 to selectively pass, to display a specified image.

In the flattened state, the polarizing layer 30 and the ink layer 20 are located on the same side of the first part 11. In the bent state, the polarizing layer 30 and a part of the ink layer 20 is located on the side of the first part 11 away from the second part 12. Furthermore, the polarizing layer 30 is located on the side of the ink layer 20 away from the display panel 10, and both are at least partially located on the first part 11.

In related technologies, the BPL adhesive is at least partially arranged in the same layer as the polarizing layer 30, and the two are adjacent to each other. The polarizing layer 30 is located on the first part 11, and BPL adhesive is located on the bending part 13. In the process of preparing the BPL adhesive, BPL droplets are usually sprayed out through the nozzle of the glue valve. On the side close to the polarizing layer 30, the BPL droplets may be adsorbed by the surface of the polarizing layer 30 away from the display panel 10 due to the capillary phenomenon, to affect the use of the polarizing layer 30 and affecting the subsequent producing processes.

In the producing process of the present disclosure, the ink layer 20 is first formed, and then the polarizing layer 30 is formed, on the side of the ink layer 20 away from the display panel 10, to have a low probability that the material of the ink layer 20 being transferred to the side of the polarizing layer 30 away from the display panel 10. Therefore, the ink layer 20 has little impact on the polarizing layer 30 and has no adverse effect on the subsequent producing processes, which improves the production yield of the display module.

In some embodiments, as shown in FIGS. 4 and 5, the display module further includes a support layer 40. The support layer 40 includes a first support part 41 located on the side of the first part 11 away from the ink layer 20. The bending part 13 is located on a side of the first part 11 in the first direction X, the first support part 41 has a first edge E1 on close to a side of the bending part 13 in the first direction X, and the polarizing layer 30 has a second edge E2 close to the side of the bending part 13 in the first direction X. The distance between the first edge E1 and the second edge E2 in the first direction X is denoted as D, where D≤0.3 mm.

In the flattened state, the support layer 40 and the ink layer 20 are respectively arranged on different sides of the display panel 10, and the first support part 41 of the support layer 40 is arranged on the first part 11 to support the first part 11. It should be noted that the support layer 40 may also include a second support part 42, which is located on the second part 12 to support the second part 12. In the bent state, the first support part 41 and the second support part 42 are both located between the first part 11 and the second part 12.

In the flattened state, the first part 11, the bending part 13, and the second part 12 are sequentially arranged in the first direction X. The first support part 41 has two opposite edges in the first direction X, and a first edge E1 is the edge that is relatively close to the bending part 13 among the two edges. Similarly, the polarizing layer 30 has two opposite edges in the first direction X, and the second edge E2 is the edge that is relatively close to the bending part 13 among the two edges.

In general, the first edge E1 corresponds to the boundary between the first part 11 and the bending part 13. That is, in the flattened state, the projection of the first edge E1 on the display panel 10 is adjacent to or overlaps with the boundary between the first part 11 and the bending part 13.

In related technologies, due to the presence of BPL adhesive, a distance is required between the second edge E2 and the boundary between the first part 11 and the bending part 13, that is, a distance is required between the second edge E2 and the first edge E1 in the first direction X, in order to meet the requirement of detection equipment used for detecting the BPL adhesive.

In one embodiment, the detection equipment typically detects a thickness by measuring a light path difference, in which a used detection incident light typically has an angle. In related technologies, the preparation of BPL adhesive is after the preparation of the polarizing layer 30, and the BPL adhesive is at least partially arranged in the same layer as the polarizing layer 30. Therefore, the polarizing layer 30 will block some of the detection light, and the detection can only be performed at the position having a distance to the second edge E2 greater than 0.3 mm.

Furthermore, if the distance between the first edge E1 and the second edge E2 is narrowed to 0.3 mm, the opening which is in the support layer 40 and is corresponding to the bending part 13 will have an impact on the detected thickness of the BPL adhesive, resulting in inaccurate detection of the thickness of the BPL adhesive. This results in uneven thickness of the prepared BPL adhesive, which can easily cause cracks during the bending process and is disadvantage for the production yield of the display module.

In the embodiment of the present disclosure, the ink layer 20 extends to the bending part 13, and no BPL adhesive needs to be provided on the bending part 13. Furthermore, the preparation of the ink layer 20 is prior to the preparation of the polarizing layer 30, and the polarizing layer 30 will not affect the detection of the thickness of the ink layer 20. Therefore, it is unnecessary to set a large distance between the first edge E1 and the second edge E2 in the first direction X, Furthermore, the distance D between the first edge E1 and the second edge E2 in the first direction X can be set to 0.3 mm or less. For example, D may be 0 mm, 0.1 mm, 0.15 mm, 0.2 mm, or 0.3 mm.

Furthermore, the polarizing layer 30 usually covers and exceeds the area of the display panel 10 that achieves display effects. Referring to FIG. 5, K represents the border area of the display module in the bent state. The size of the border area in the first direction X includes the distance between the first edge E1 and the second edge E2 in the first direction X. At this point, if the distance between the first edge E1 and the second edge E2 in the first direction X is too large, the size of the border area in the first direction X is too large, resulting in a decrease in the screen-to-body ratio of the display module, which is disadvantage to the display effect.

Therefore, the embodiment of the present disclosure sets the distance D between the first edge E1 and the second edge E2 in the first direction X to be no more than 3 μm, and the display module has a large screen-to-body ratio, improving the display effect and meeting the requirement of narrow border.

In addition, it can be seen from FIG. 5 that, when the display module is in the bent state, the thickness of the ink layer 20 also affects the size of the border area in the first direction X. Therefore, as the thickness of the ink layer 20 is usually smaller than the thickness of the BPL adhesive, the embodiment can further reduce the size of the border area in the first direction X, to meet the requirement of narrow border.

Figure 6:
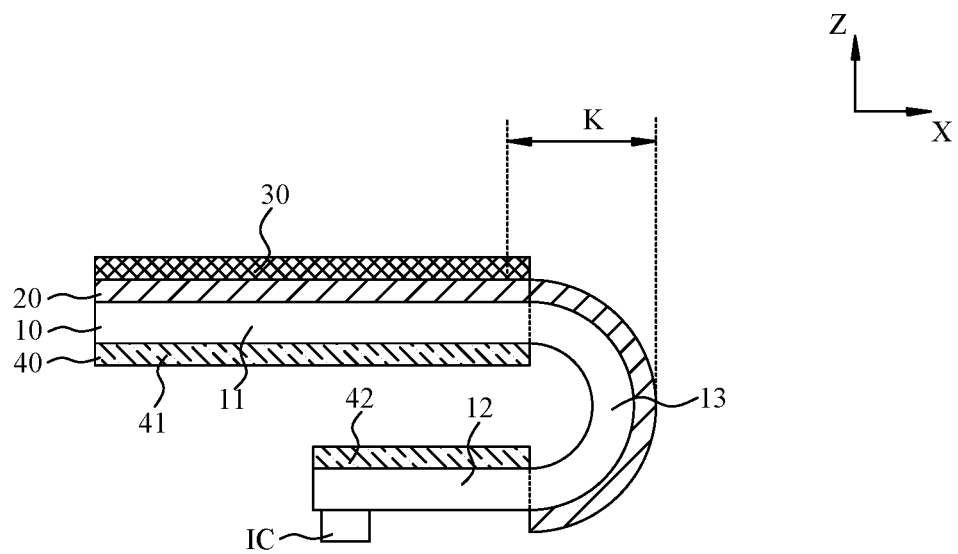
FIG. 6 is a cross-sectional view of a display module in a bent state according to an embodiment of the present disclosure.

In some embodiments, referring to FIG. 6, the projection of the first edge E1 overlaps with the projection of the second edge E2 in the thickness direction Z, that is, the distance D between the first edge E1 and the second edge E2 in the first direction X is equal to 0. This can further increase the screen-to-body ratio of the display module, to improve the display effect and meeting the requirement of narrow border.

It should be noted that the material of the polarizing layer 30 is usually a hard material. If the surface for preparing the polarizing layer 30 is uneven, it is easy to cause cracks in the polarizing layer 30. In the embodiment of the present disclosure, as the ink layer 20 extends from the first part 11 to the bending part 13, the ink layer 20 can cover the area where the polarizing layer 30 is located, ensuring that surface for preparing the polarizing layer 30 is relatively flat, which can improve the production yield of the polarizing layer 30 and improve the accuracy of the relative position of the first edge E1.

Figure 7:
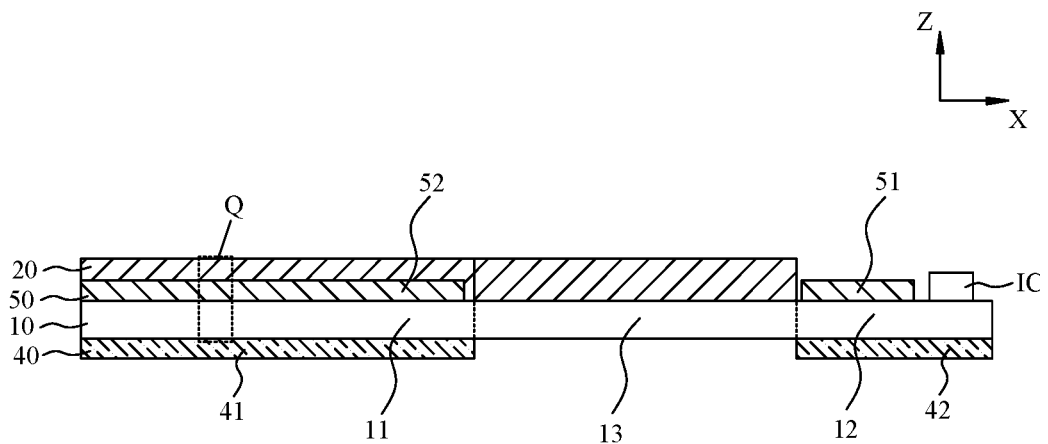
FIG. 7 is a cross-sectional view of a display module in a flattened state according to an embodiment of the present disclosure.

In some embodiments, referring to FIG. 7, the display module further includes an optical functional layer 50 arranged between the display panel 10 and the ink layer 20. The refractive index of the ink layer 20 is higher than that of the optical functional layer 50. The optical functional layer 50 covers at least part of the first part 11, and there is no overlapping area between the projection of the optical functional layer 50 and the projection of the bending part 13 in the thickness direction Z.

The optical functional layer 50 may be arranged only on the first part 11, that is, the projection of the optical functional layer 50 in the thickness direction Z is located within the projection of the first part 11 in the thickness direction Z.

It should be noted that when the optical functional layer 50 is arranged only on the first part 11, the projection of the optical functional layer 50 in the thickness direction Z may abut with the projection of the bending part 13 in the thickness direction Z, or the projection of the optical functional layer 50 in the thickness direction Z may be spaced from the projection of the bending part 13 in the thickness direction Z, which is not limited in the present disclosure.

Both the optical functional layer 50 and the ink layer 20 may be used to adjust the light emitted by the display panel 10 to improve the display effect. The refractive index of the optical functional layer 50 is not the same as that of the ink layer 20. The ink layer 20 has a high refractive index than the optical functional layer 50 has a low refractive index. The optical functional layer 50 and the ink layer 20 may be adjacent to each other. That is, there is no other layer between the optical functional layer 50 and the ink layer 20. In one embodiment, the optical functional layer 50 and the ink layer 20 may be spaced from each other. That is, there is another layer between the optical functional layer 50 and the ink layer 20. For the convenience of description, only the case that the optical functional layer 50 and the ink layer 20 are adjacent to each other is described as an example below.

In the thickness direction Z, there is no overlapping area between the projection of the optical functional layer 50 and the projection of the bending part 13. That is, the optical functional layer 50 is not arranged on the bending part 13.

The optical functional layer 50 may be arranged only on the first part 11, or may be arranged on both the first part 11 and the second part 12.

Due to a difference in modulus between the low refractive index material of the optical functional layer 50 and the high refractive index material of the ink layer 20, if both the optical functional layer 50 and the ink layer 20 are arranged on the bending part 13, there will be a difference or mismatch in bending performance, which makes it difficult to effectively protect the bending part 13 and relieve the bending stress, and may have a problem of separation between adjacent layers.

Therefore, in the embodiment of the present disclosure, only the ink layer 20 is partially provided on the bending part 13, but no optical functional layer 50 is provided on the bending part 13. That is, the bending part 13 is protected by only the ink layer 20. This can reduce the modulus difference caused by different refractive index materials, to improve the protection effect on the bending part 13 and improving the production yield of the display module.

Figure 8:
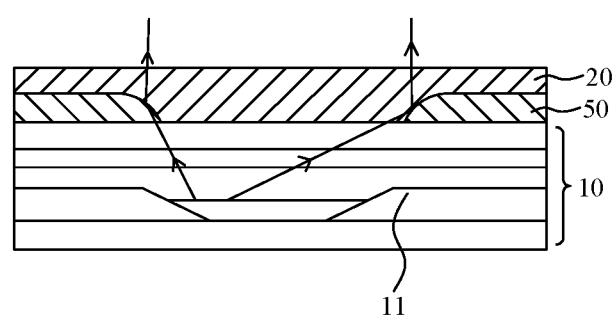
FIG. 8 is an enlarged schematic diagram of region Q in FIG. 7.

It should be noted that the ink layer 20 in the embodiment of the present disclosure can be used as a high refractive index layer in the MLP (Micro Lens Panel) technology to improve the display performance. In one embodiment, referring to FIG. 8, in the embodiment of the present disclosure, by arrange both the optical functional layer 50 of a low refractive index and the ink layer 20 of a high refractive index on the first part 11, the light emitted by the first part 11 is directly refracted and reflected at the interface between the optical functional layer 50 and the ink layer 20, so as to adjust the propagation path of the light and achieve the focusing of the light, to improve display brightness and display effect.

In addition, the high refractive material of the ink layer 20 and the low refractive material of the optical functional layer 50 can form a visual contrast, and the edge of some structures in the optical functional layer 50 can be clearly seen at a position close to the edge of the bending part 13, which can reduce the production difficulty.

Figure 9:
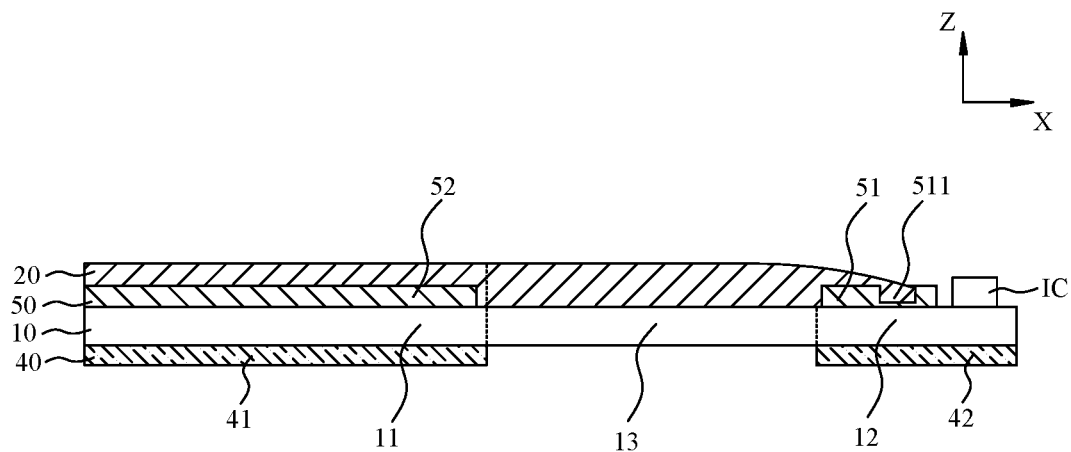
FIG. 9 is a cross-sectional view of a display module in a flattened state according to an embodiment of the present disclosure.
Figure 10:
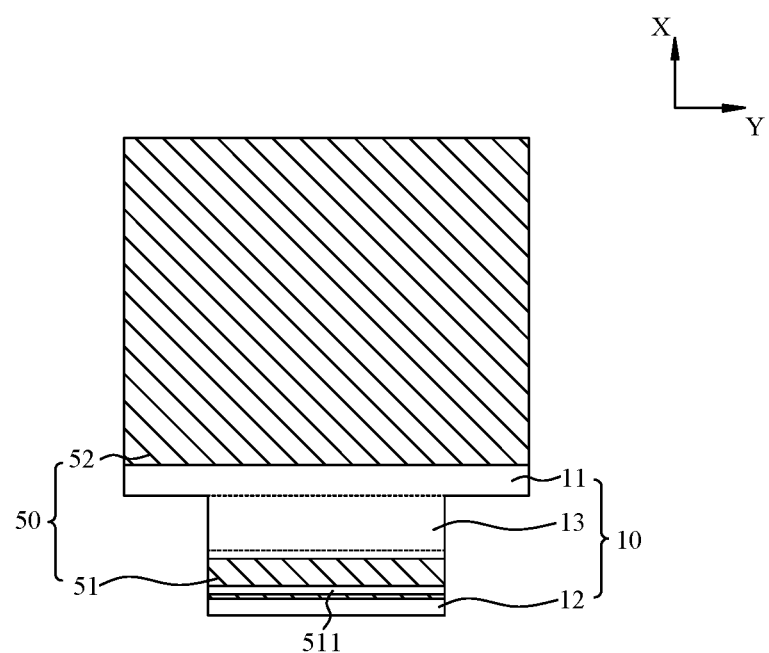
FIG. 10 is a schematic diagram of the positional relationship between a display panel and an optical functional layer in a display module according to an embodiment of the present disclosure.

In some embodiments, referring to FIGS. 9 and 10, the ink layer 20 extends to the second part 12, and the optical functional layer 50 includes a first optical part 51 arranged on the second part 12. The surface of the first optical part 51 facing away the second part 12 is recessed inward to form a limiting channel 511, and the ink layer 20 is ended by the limiting channel 511.

The ink layer 20 extends from the first part 11 to the second part 12 through the bending part 13. That is, in the flattened state, the ink layer 20 completely covers the bending part 13 in the first direction X. The optical functional layer 50 covers both the first part 11 and at least a part of the second part 12. The optical functional layer 50 includes the first optical part 51 located on the second part 12 and a second optical part 52 located on the first part 11. In the flattened state, the first optical part 51 and the second optical part 52 are spaced apart, and the minimum distance between the first optical part 51 and the second optical part 52 in the first direction X is not less than the length of the bending part 13 in the first direction X.

In addition, the embodiment of the present disclosure also provides a limiting channel 511 on the surface of the first optical part 51 facing away the second part 12. The limiting channel 511 extends along a second direction Y, and the first direction X intersects with the second direction Y. For example, the first direction X is perpendicular to the second direction Y. The limiting channel 511 is used to limit the position of the edge of the ink layer 20 in the first direction X. In one embodiment, since the optical functional layer 50 is located between the ink layer 20 and the display panel 10, when producing the display module, the optical functional layer 50 is first formed, and then the ink layer 20 is formed.

The ink material used to form the ink layer 20 usually has fluidity. During the preparation process of the ink layer 20, the ink material flows and the limiting channel 511 can prevent the ink material from flowing away from the first part 11 in the first direction X, that is, the flowing of the ink layer 20 is stopped by the limiting channel 511, which can reduce the risk of the ink layer 20 extending to the driver chip in the second part 12, to improve the reliability of the display module.

Figure 11:
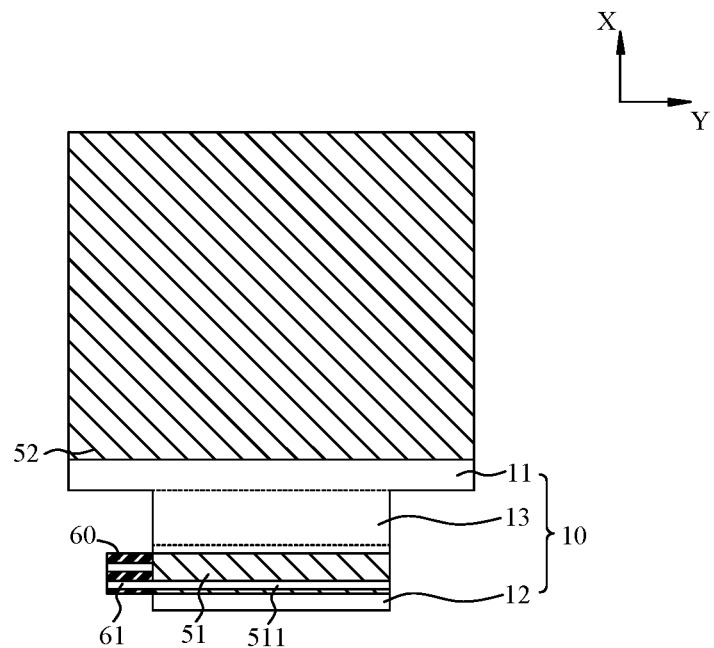
FIG. 11 is a schematic diagram of the positional relationship between a display module and a sacrificial part according to an embodiment of the present disclosure.

It should be noted that, as shown in FIG. 11, during the producing process, an additional sacrificial part 60 may be provided on an outer side of the display module. The sacrificial part 60 may be connected to at least one side of the first optical part 51 in the second direction Y. The sacrificial part 60 is provided with one or more sacrificial channels 61. A part of the sacrificial channels 61 may be connected to the limiting channel 511, or each of the sacrificial channels 61 are separated from the limiting channel 511. During the preparation process of the ink layer 20, some ink materials may flow into the limiting channel 511 and the sacrificial channels 61, which can limit the position of the ink layer 20. After the ink layer 20 is prepared, the sacrificial part 60 and the sacrificial channels 61 on the sacrificial part 60 can be cut off from the display module to remove excess ink material from the display module.

Figure 12:
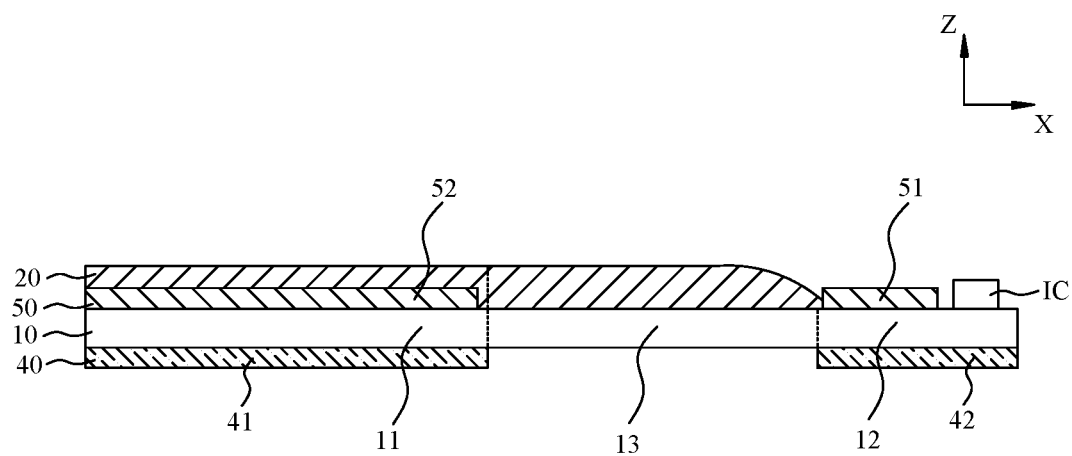
FIG. 12 is a cross-sectional view of a display module in a flattened state according to an embodiment of the present disclosure.

In some embodiments, referring to FIG. 12, the bending part 13 is located on one side of the first part 11 in the first direction X, and the optical functional layer 50 includes a first optical part 51 arranged on the second part 12. In the first direction X, the ink layer 20 is ended at the side of the first optical part 51 close to the bending part 13.

The optical functional layer 50 includes both the first optical part 51 located on the second part 12 and the second optical part 52 located on the first part 11. The first optical part 51 and the second optical part 52 are spaced in the first direction X. In this case, the edge of the first optical part 51 close to the bending part 13 in the first direction X is the edge of the first optical part 51 facing to the second optical part 52.

The ink layer 20 is ended at the end of the first optical part 51 close to the bending part 13. In other words, the ending position of the ink layer 20 is the starting position of the first optical part 51. In the embodiment of the present disclosure, by setting the first optical part 51 and the second optical part 52 which are apart to each other, the edge of the first optical part 51 towards the second optical part 52 can be used to limit the ink layer 20, to reduce the probability of the ink material flowing to the driving chip or other components on the second part 12, and thus improving the reliability of the display module.

Figure 13:
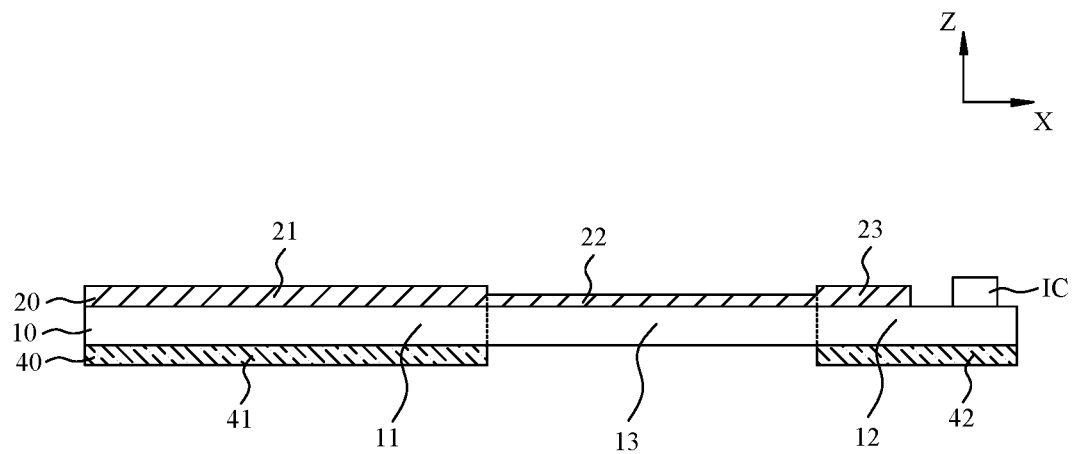
FIG. 13 is a cross-sectional view of a display module in a flattened state according to an embodiment of the present disclosure.

In some embodiments, referring to FIG. 13, the ink layer 20 includes a first ink part 21 located on the first part 11 and a second ink part 22 located on the bending part 13. The average thickness of the second ink part 22 is smaller than the average thickness of the first ink part 21. The thickness mentioned in the embodiment of the present disclosure refers to the size in the thickness direction Z in the flattened state.

The first ink part 21 is arranged on the first part 11, and the first ink part 21 may have the same thickness or different thicknesses in different positions. The average thickness of the first ink part 21 is calculated by dividing the total volume of the first ink part 21 in the flattened state by a projected area of the first ink part 21 in the thickness direction Z. The second ink part 22 is arranged on the bending part 13, and the second ink part 22 may have the same thickness or different thicknesses in different positions. The average thickness of the second ink part 22 is calculated by dividing the total volume of the second ink part 22 in the flattened state by the projected area of the second ink part 22 in the thickness direction Z.

In general, a greater thickness leads to a higher structural strength and a greater bending stress. On this basis, the embodiment of the present disclosure configures the average thickness of the second ink part 22 to be less than the average thickness of the first ink part 21. Therefore, during the transition of the display module from the flattened state to the bent state, the bending stress can be reduced, to reduce the bending difficulty of the display module. Meanwhile, due to the presence of the second ink part 22, the bending part 13 can be protected during the bending process, to reduce the occurrence of cracks and other problem in the bending part 13.

In some other embodiments, the ink layer 20 also includes a third ink part 23 arranged on the second part 12, and the average thickness of the second ink part 22 is smaller than the average thickness of the third ink part 23, to reduce the bending difficulty of the display module.

Figure 14:
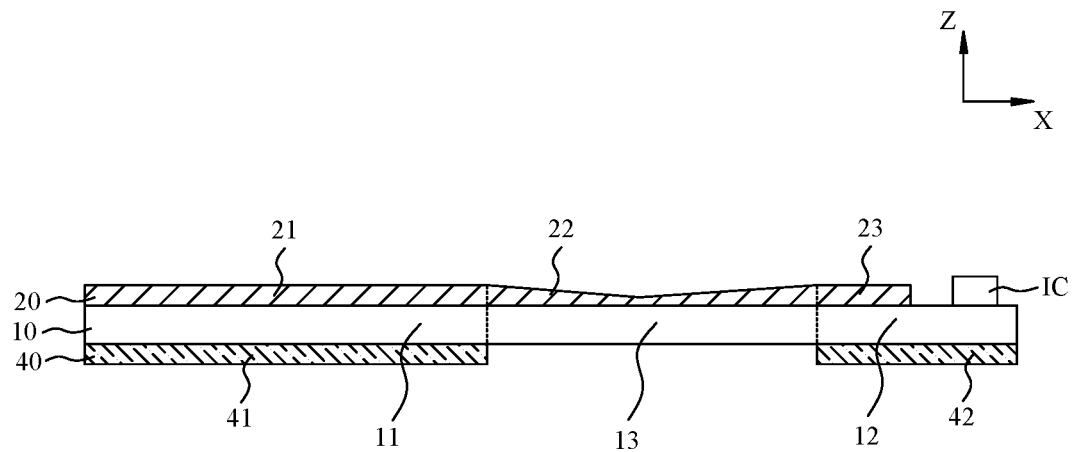
FIG. 14 is a cross-sectional view of a display module in a flattened state according to an embodiment of the present disclosure.
Figure 15:
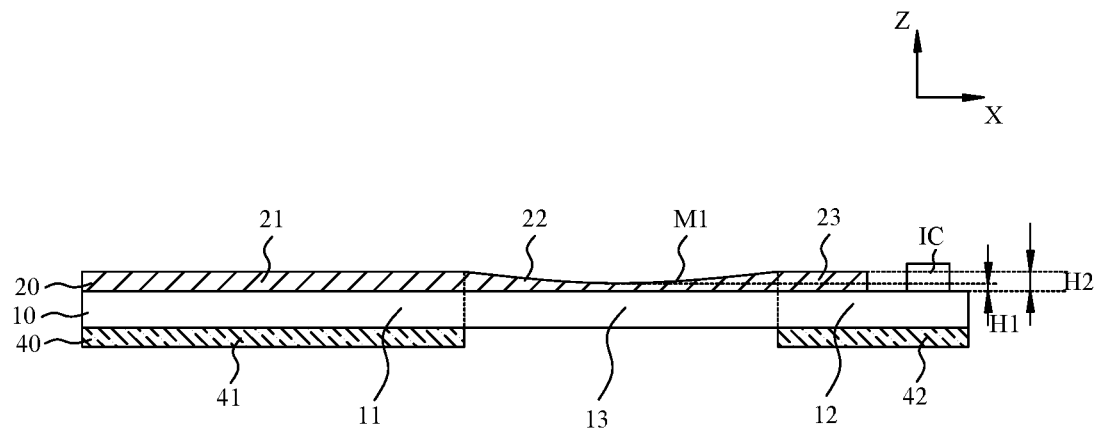
FIG. 15 is a cross-sectional view of a display module in a flattened state according to an embodiment of the present disclosure.

In some embodiments, referring to FIGS. 14 and 15, in the direction from the first part 11 to the second part 12, the thickness of the second ink part 22 is first gradually decreased, and then gradually increased.

It should be noted that the thickness variation of the second ink part 22 mentioned here refers to the thickness variation of the second ink part 22 at different positions in the first direction X when the display module is in the flattened state. The thicknesses of the second ink part 22 at different positions are not totally the same. The thickness of the second ink part 22 close to the first part 11 and the second part 12 is greater than the thickness of the second ink part 22 at the center position in the first direction X.

The thickness of the second ink part 22 may vary in a gradient, that is, in the direction from the first part 11 to the second part 12, the surface of the second ink part 22 facing away the bending part 13 may form a stepped structure. In one embodiment, the thickness of the second ink part 22 may vary in a linear manner, that is, in the direction from the first part 11 to the second part 12, the surface of the second ink part 22 facing away the bending part 13 may have two intersecting planar structures, or the thickness of the second ink part 22 may vary in an exponential manner, which is not limited in the present disclosure.

During the transition of the display module from the flattened state to the bent state, the central position of the bending part 13 and the second ink part 22 in the first direction X is usually the bending starting point. Therefore, the embodiment of the present disclosure configures the second ink part 22 to be thick on both sides and thin in the center in the first direction X, ensuring easy bending at the bending starting point, to reduce the difficulty of bending.

Figure 16:
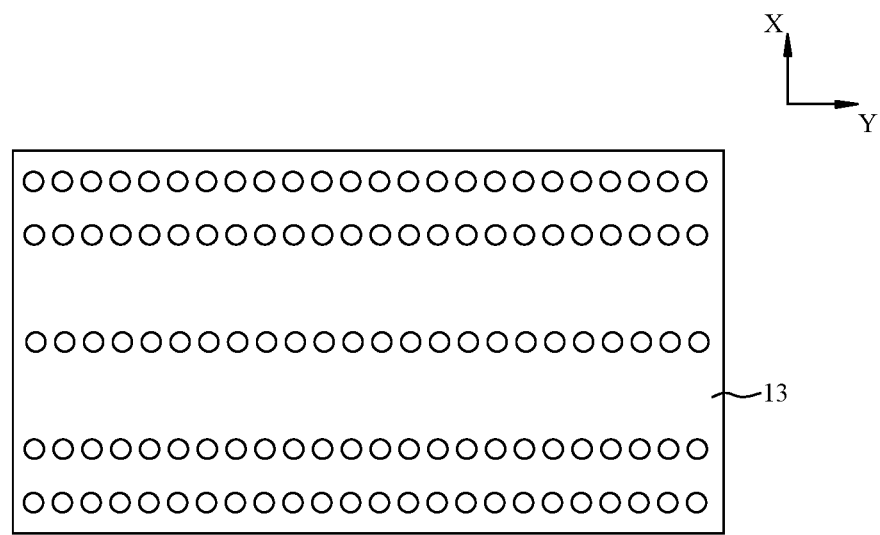
FIG. 16 is a schematic diagram of the position relationship between an ink material and a bending part in a producing procedure of the ink layer in the display module according to an embodiment of the present disclosure.

It should be noted that the ink material used to form the ink layer 20 typically has fluidity. Therefore, in the process of forming the ink layer 20, micro nozzle printing may be used to drip the ink material at specific positions to adjust the thickness of the ink layer 20 at different positions. Referring to FIG. 16, when preparing the second ink part 22, the number of dripped rows of the ink material in the first direction X can be controlled by a micro nozzle, and more rows of ink material drip near the edge of the bending part 13 in the first direction X, compared with that at the starting position of bending. Then the ink material flows and blends with each other, and finally the thickness of the formed second ink part 22 has the least value at the center of the first direction X, and gradually increases from the center to the edges on both sides.

In addition, in related technologies, the thicknesses at different positions of BPL adhesive used to protect the bending part 13 is usually significantly different from each other, resulting in cracks and other issues during the bending process. In the embodiment of the present disclosure, although the thickness of the second ink part 22 is not the same at different positions, the differences of thicknesses at different positions of the second ink part 22 are usually small due to the overall small thickness of the ink layer 20. Therefore, the risk of cracks resulted from uneven thickness of the second ink part 22 is also small, which can ensure the protection of the bending part 13 by the second ink part 22.

In some embodiments, referring to FIG. 15, the second ink part 22 includes a first surface M1 facing away the bending part 13. The first surface M1 is an arc-shaped surface recessed towards the bending part 13.

The first surface M1 is the surface of the second ink part 22 facing away the bending part 13. In the flattened state, the distance between the first surface M1 and the bending part 13 in the thickness direction Z determines the average thickness of the second ink part 22. The first surface M1 has an arc shape. It should be noted that the arc shape mentioned here refers to the shape of the first surface M1 in a flattened state in a cross-sectional view.

In the embodiment of the present disclosure, the arc-shaped surface protrudes towards the bending part 13, that is, the center of the first surface M1 is low, and the two sides of the first surface M1 are high. That is, the second ink part 22 is thin at the center position in the first direction X, and is thick near the two sides. This design makes it easy to bend at the starting point of bending, to reduce the difficulty of bending.

In some embodiments, the ink layer 20 further includes a third ink part 23 arranged on the second part 12, and the thickness of the second ink part 22 at a position where the second ink part 22 is connected to the first ink part 21 is the same as the thickness of the second ink part 22 at a position where the second ink part 22 is connected to the third ink part 23.

In the flattened state, the first ink part 21, the second ink part 22, and the third ink part 23 are sequentially connected in the first direction X. In the direction from the first part 11 to the second part 12, the thickness of the second ink part 22 first is gradually decreased, and then gradually increased. On this basis, in the present embodiment, the thickness of the second ink part 22 at a position where the second ink part 22 is connected to the first ink part 21 is the same as the thickness of the second ink part 22 at a position where the second ink part 22 is connected to the third ink part 23, and the second ink part 22 has the least thickness at the center of the second ink part 22, to reduce the difficulty of bending.

It should be noted that in the display module, the connection position between the first ink part 21 and the second ink part 22 usually does not have a display function, and even a significant change in the film structure at the connection position will not affect the display effect of the display module. Therefore, it is unnecessary to have a smooth transition between the first ink part 21 and the second ink part 22, that is, the thickness of the second ink part 22 at the position where the second ink part 22 is connected to the first ink part 21 can be the same or different from the thickness of the first ink part 21 at the position where the first ink part 21 is connected to the second ink part 22. Similarly, it is unnecessary to have a smooth transition between the second ink part 22 and the third ink part 23, that is, the thickness of the second ink part 22 at the position where the second ink part 22 is connected to the third ink part 23 can be the same or different from the thickness of the third ink part 23 at the position where the third ink part 23 is connected to the second ink part 22.

Figure 17:
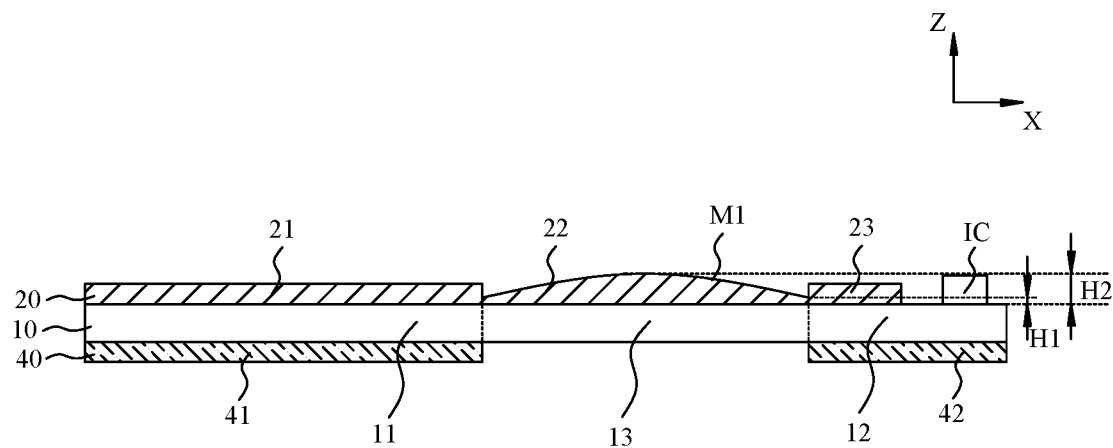
FIG. 17 is a cross-sectional view of a display module in a flattened state according to an embodiment of the present disclosure.

In some embodiments, referring to FIG. 17, in the direction from the first part 11 to the second part 12, the thickness of the second ink part 22 is first gradually increased, and then gradually decreased.

It should be noted that the thickness variation of the second ink part 22 mentioned here refers to the thickness variation of the second ink part 22 at different positions in the first direction X when the display module is flattened. The thickness at different positions of the second ink part 22 is not exactly the same. The thickness of the second ink part 22 near the first part 11 and the second part 12 is smaller than the thickness of the second ink part 22 at the center X position in the first direction.

In some embodiments, the thickness of the second ink part 22 may vary in a gradient. That is, in the direction from the first part 11 to the second part 12, the surface of the second ink part 22 facing away the bending part 13 may form a stepped shape. In some embodiments, the thickness of the second ink part 22 may vary linearly. That is, in the direction from the first part 11 to the second part 12, the surface of the second ink part 22 facing away the bending part 13 may include two intersecting planar surfaces. In some embodiments, the thickness of the second ink part 22 may vary exponentially. The present disclosure does not limit the thickness variation manner of the second ink part 22.

The embodiment of the present disclosure configures the second ink part 22 to be thick in the center and thin on both sides in the first direction X, to increase the lateral pressure of the display module in a bent state. In some cases, a strength test needs to be performed on the display module in the bent state. For example, a test pressure head is pressed near the junction between the bending part 13 and the first part 11, and a test pressure in the thickness direction Z is provided to the display module through the test pressure head. When the test pressure exceeds a threshold, the display module will have relative deformation, and at this time, the test pressure head will displace in the first direction X. The lateral pressure refers to the pressure produced when the test head displaces in the first direction X.

In the embodiment of the present disclosure, due to the design of the second ink part 22 being thick in the center and thin on both sides, it is difficult to deform at the central position of the second ink part 22, to improve the lateral pressure of the display module in the bent state, i.e. improving the impact resistance of the display module in use and thus improving the reliability of the display module.

Figure 18:
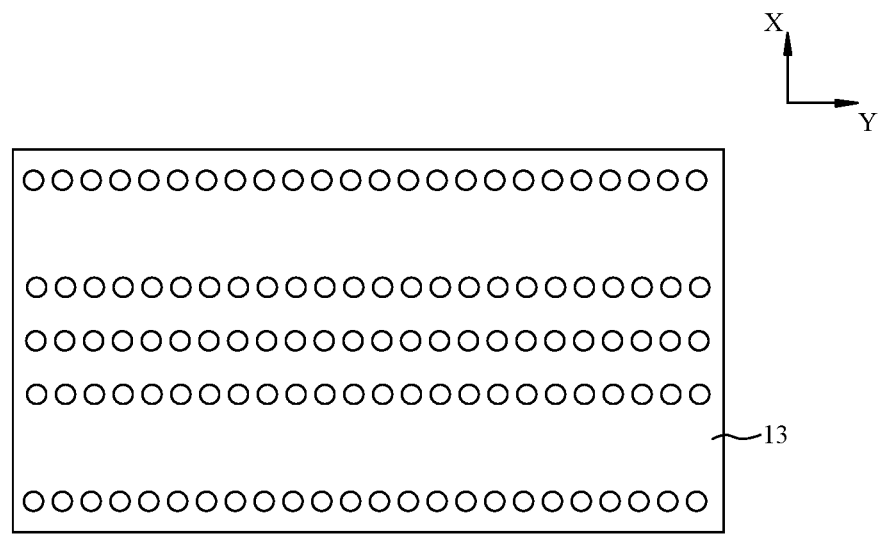
FIG. 18 is a schematic diagram of the position relationship between an ink material and a bending part in a producing procedure of an ink layer in a display module according to an embodiment of the present disclosure.

It should be noted that the ink material used to form the ink layer 20 typically has fluidity. Therefore, during the process of forming the ink layer 20, micro nozzle printing may be used to drop the ink material at specific positions to adjust the thickness of the ink layer 20 at different positions. Referring to FIG. 18, when preparing the second ink part 22, the number of dripped rows of the ink material in the first direction X can be controlled by a micro nozzle, and more rows of ink material can drip near the bending starting position of the bending part 13, compared with the edges on both sides of the first direction X. Then the ink material flows and blends with each other, and finally the thickness of the formed second ink part 22 has the greatest value at the center of the first direction X, and gradually decreases from the center to the edges on both sides.

In some embodiments, as shown in FIG. 17, the second ink part 22 includes a first surface M1 facing away the bending part 13. The first surface M1 is an arc-shaped surface protruding away from the bending part 13.

In the embodiment of the present disclosure, the arc-shaped surface protrudes away from the bending part 13, that is, the center position of the first surface M1 is high, and the two sides are low. Furthermore, in the first direction X, the thickness of the second ink part 22 is large at the center position, and is small at the two sides. This design can further enhance the lateral pressure of the display module in the bent state, in order to improve the reliability of the display module.

In some embodiments, as shown in FIG. 15 or 17, the least thickness of the second ink part 22 is H1, and the greatest thickness is H2, where $H2 \geq H1+5$ μm.

In the embodiment of the present disclosure, the thicknesses of the second ink part 22 at different positions may be different from each other. When the second ink part 22 is thin in the center and thick on both sides in the first direction X, the maximum difference between thicknesses at different positions in the second ink part 22 is limited to be not less than 5 μm in this embodiment, to ensure the thickness of the second ink part 22 to be as small as possible at the center position in the first direction X, to reduce the bending difficulty of the display module.

When the second ink part 22 is thick in the center and thin on both sides in the first direction X, the maximum difference between thicknesses at different positions in the second ink part 22 is limited to be not less than 5 μm in this embodiment, to ensure the thickness of the second ink part 22 to be as large as possible at the center position in the first direction X, to improve the lateral pressure that the display module can withstand in the bent state, to improve the reliability of the display module.

It should be noted that the greatest thickness H2 of the second ink part 22 may be less than, equal to or greater than the average thickness of the first ink part 21, which is not limited herein, as long as the average thickness of the second ink part 22 is less than the average thickness of the first ink part 21.

Figure 19:
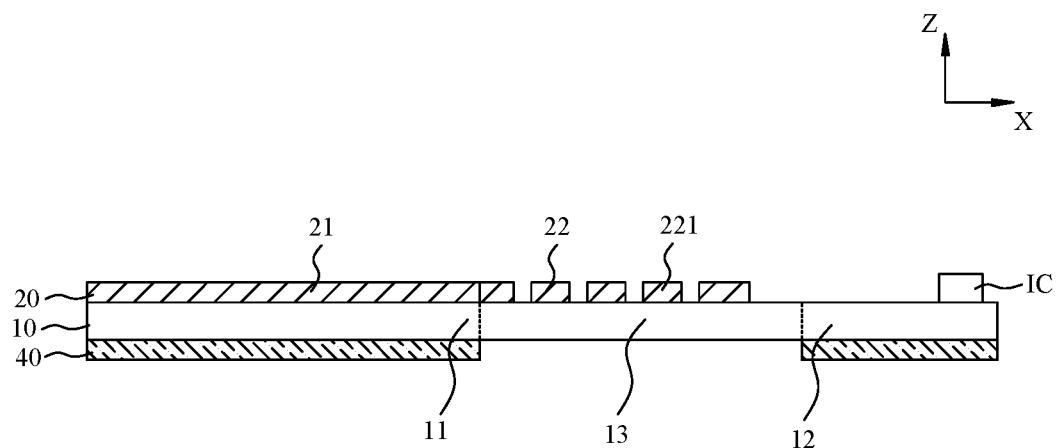
FIG. 19 is a cross-sectional view of a display module in a flattened state according to an embodiment of the present disclosure.
Figure 20:
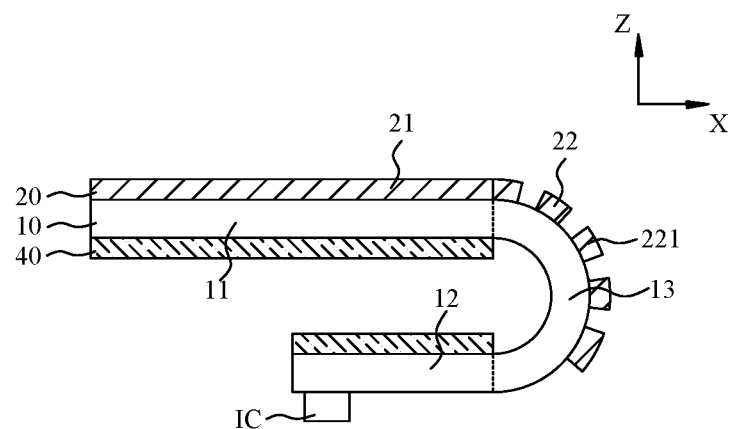
FIG. 20 is a cross-sectional view of a display module in a bent state according to an embodiment of the present disclosure.
Figure 21:
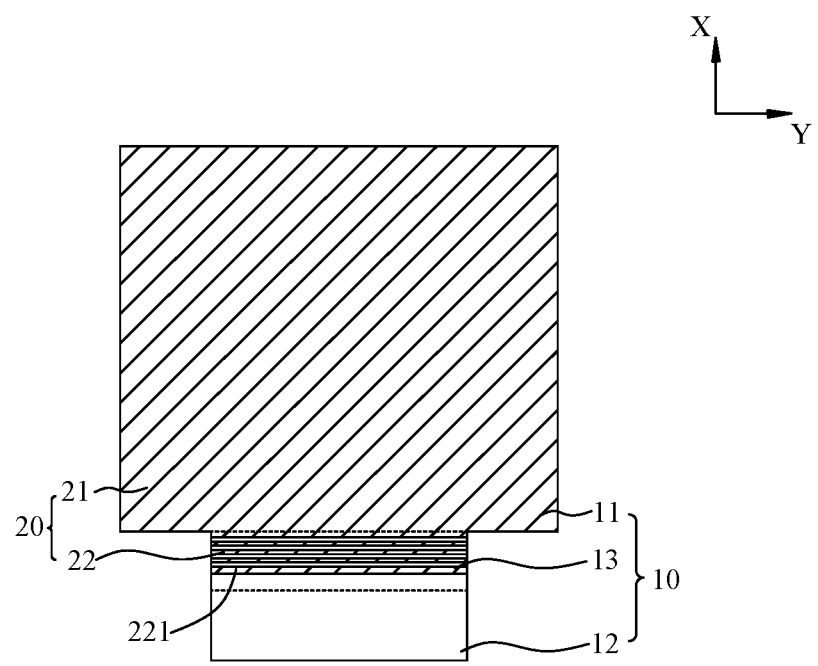
FIG. 21 is a schematic diagram of the positional relationship between a display panel and an ink layer in a display module according to an embodiment of the present disclosure.

In some embodiments, referring to FIGS. 19 to 21, the bending part 13 is located on one side of the first part 11 in the first direction X, and the ink layer 20 includes a second ink part 22 arranged on the bending part 13. The second ink part 22 includes multiple first segments 221, which are spaced apart from each other in the first direction X.

In the flattened state, multiple first segments 221 are spaced in the first direction X, where the sizes and shapes of the first segments may be the same or different, and the spacing distances between adjacent first segments 221 in the first direction X may be the same or different, which are not limited in the embodiment of the present disclosure.

In the embodiment of the present disclosure, by arranging the multiple first segments 221 apart from each other, gaps are formed between adjacent first segments 221. The thickness of the display module at the gaps is usually small. Therefore, the existence of the gaps can reduce the bending difficulty of the display module, which is advantage to rapid transition of the display module from the flattened state to the bent state, and improves the producing efficiency of the display module.

It should be noted that in order to ensure the protective effect of the second ink part 22 on the bending part 13, the spacing distances between the multiple first segments 221 should be relatively small. For example, the maximum distance between adjacent first segments 221 is less than 5 µm, which can achieve rapid bending of the display module while having the protection effect of the bending part 13.

Figure 22:
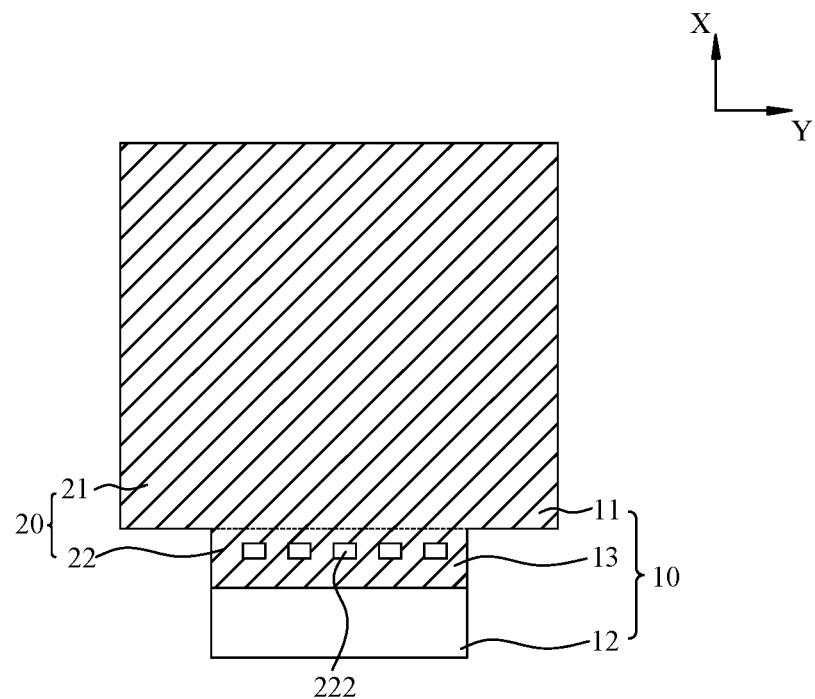
FIG. 22 is a schematic diagram of the positional relationship between a display panel and an ink layer in a display module according to an embodiment of the present disclosure.

In some other embodiments, referring to FIG. 22, the second ink part 22 is provided with hollows 222 extending through the second ink part 22.

In the flattened state, the hollows 222 may extend through the second ink part 22 in the thickness direction, or may extend through the second ink part 22 in other directions intersecting with the thickness direction. For example, in the flattened state, the projection of the second ink part 22 in the thickness direction presents a mesh structure, and the meshes in the mesh structure correspond to the positions of the hollows 222.

In the embodiment of the present disclosure, the thickness of the display module at the positions of the hollows 222 is usually small. Therefore, the existence of the hollows 222 can reduce the bending difficulty of the display module, to facilitate the rapid transition of the display module from the flattened state to the bent state, and improving the producing efficiency of the display module.

Figure 23:
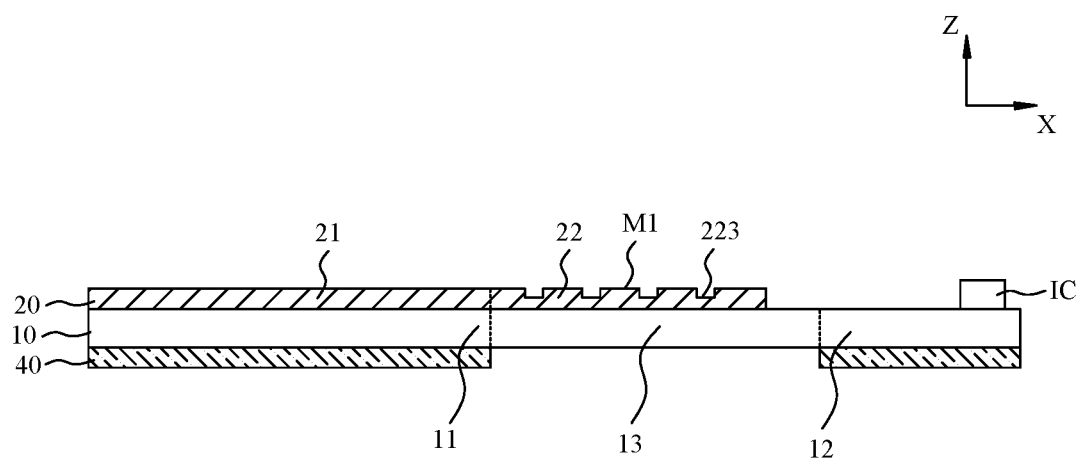
FIG. 23 is a cross-sectional view of a display module in a flattened state according to an embodiment of the present disclosure.
Figure 24:
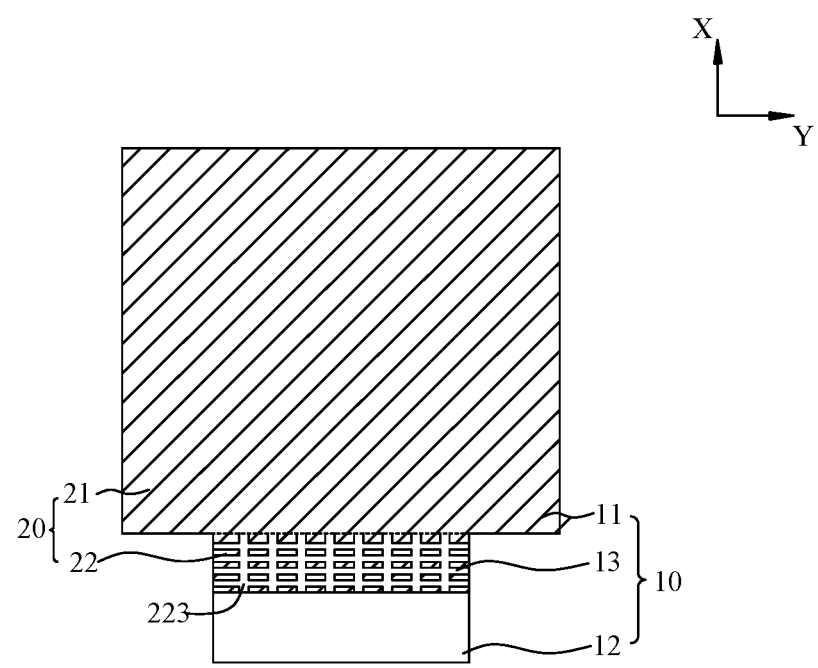
FIG. 24 is a schematic diagram of the positional relationship between a display panel and an ink layer in a display module according to an embodiment of the present disclosure.

In some embodiments, referring to FIGS. 23 and 24, the ink layer 20 includes a second ink part 22 arranged on the bending part 13, which includes a first surface M1 facing away the bending part 13, and a portion of the first surface M1 is recessed to form grooves 223.

The grooves 223 are formed by concaving the first surface M1 towards the bending part 13. In the flattened state, the grooves 223 may be recessed in the thickness direction Z or in another direction intersecting with the thickness direction Z. The number of the grooves 223 is not limited by the embodiments of the present disclosure. For example, the number of the grooves 223 may be one or more.

Due to the existence of the grooves 223, the thickness of some portions of the second ink part 22 is small, to reduce the difficulty of bending the display module. At the same time, due to the existence of the part of the second ink part 22 between the grooves 223 and the bending part 13, the bending part 13 can still be protected, reducing the risk of producing cracks in the bending part 13.

In addition, during the bending process, due to the thickness of the ink layer 20, the bending radius of the side of the second ink part 22 facing to the bending part 13 is not the same as the bending radius of side of the second ink part 22 facing away the bending part 13. In this case, if the first surface M1 is a continuous plane, it is easy to generate bending stress in the second ink part 22 during the bending process, which affects the structural stability of the second ink part 22, resulting in damage or other risks.

In the embodiment of the present disclosure, the grooves 223 are arranged on the first surface M1. During the bending process, the existence of the grooves 223 can release the stress generated by the deformation of the second ink part 22, to improve the structural reliability of the second ink part 22.

It should be noted that, the depth of the grooves 223 in the thickness direction Z in the flatted state is not limited in the present disclosure. For example, the depth of the grooves 223 in the thickness direction Z may be ½ or ⅓ of the average thickness of the second ink part 22.

In some embodiments, the transmittance of the ink layer 20 is not less than 90%.

In embodiments of the present disclosure, a part of the ink layer 20 is arranged on the first part 11, and the first part 11 is arranged with some structures providing a display function for the display panel 10. On this basis, in order to improve the maximum brightness of the display module, it is necessary to increase the light extraction efficiency of the display module. Therefore, in the embodiment of the present disclosure, the material of the ink layer 20 is limited and the transmittance of the ink layer 20 is not less than 90%, to improve the light extraction efficiency of the display module and improving the display effect.

In some embodiments, the curing rate of the ink layer 20 is not less than 90%.

The ink material needs to be appropriately cured to form the ink layer 20. The present embodiment does not limit the curing method of the ink layer 20. For example, the ink layer 20 may be cured by ultraviolet radiation.

Due to improper curing conditions or other factors, the ink layer 20 is usually not sufficiently cured, thus affecting the structural stability of the ink layer 20. Therefore, in the embodiment of the present disclosure, the curing rate of the ink layer 20 is limited to be not less than 90% to ensure that the shape of the prepared ink layer 20 can be maintained in good condition, and ensure that the ink layer 20 can meet the bending requirements.

In some embodiments, the ink layer 20 includes zirconium dioxide.

The chemical formula of the zirconium dioxide is $ZrO_2$. By including zirconium dioxide in the ink layer 20, the refractive index of the ink layer 20 can be increased, to change the direction of exit light to improve display brightness and reduce the loss of the display module.

In some embodiments, the thickness of the ink layer 20 is W, where 5 µm≤W≤30 µm.

The thicknesses of the ink layer 20 at different positions may be the same or different. In the embodiment of the present disclosure, the thickness W of the ink layer 20 at any position meets 5 µm≤W≤30 µm. The thickness at the thinnest position of the ink layer 20 needs to be not less than 5 µm. The thickness at the thickest position of the ink layer 20 needs to be not exceed 30 µm.

If the thickness W of the ink layer 20 is too small, it is difficult for the ink layer 20 to effectively protect the bending part 13 during the bending process, which can easily result in cracks and other problems in the bending part 13. Therefore, the embodiment of the present disclosure configures the thickness W to be not less than 5 µm, which ensures that the ink layer 20 on the bending part 13 can well protect the bending part 13.

If the thickness W of the ink layer 20 is too large, the ink layer 20 will result in an increase in the overall thickness of the final display module, which is disadvantage to the user experience and cannot meet the requirements of lightness and thinness. Therefore, the embodiment of the present disclosure configures the thickness W to be not greater than 30 µm, to reduce the overall thickness of the final display module and meeting the requirements of lightness and thinness.

In addition, in related technologies, the thickness of BPL adhesive used to cover the bending part 13 is usually 90±20 µm or 70±20 µm. The embodiment of the present disclosure configures the thickness W to be not greater than 30 µm. Compared with the BPL adhesive, the thickness of the ink layer 20 is smaller, which can reduce the border size of the display module in the bent state, to improve the display effect.

In some embodiments, the elastic modulus of the ink layer 20 is E, where 0.1 GPa≤E≤10 GPa. For example, E is one of 0.1 GPa, 0.5 GPa, 1 GPa, 3 GPa, 5 GPa, and 10 GPa.

The elastic modulus refers to the positive proportional coefficient between stress and strain of the material during the elastic deformation stage (i.e. conforming to the Hooke's law).

If the elastic modulus E of the ink layer 20 is too small, during the transition from the flattened state to the bent state, the ink layer 20 will undergo significant deformation, which can easily cause significant displacement from the display panel 10, affecting the production yield of the display module. At the same time, as the thickness of the ink layer 20 is usually smaller than the thickness of BPL adhesive, it is necessary to ensure that ink layer 20 has a large elastic modulus to meet the strength requirements. Therefore, the embodiment of the present disclosure configures the elastic modulus E of the ink layer 20 to be not less than 0.1 GPa, to ensure the reliability of the relative position between the ink layer 20 and the display panel 10 during the bending process, and meet the strength requirements of the ink layer 20.

If the elastic modulus E of the ink layer 20 is too large, the ink layer 20 may be easily separated from the bending part 13 during the transition from the flattened state to the bent state. Therefore, the embodiment of the present disclosure configures the elastic modulus E of the ink layer 20 to be not exceed 10 GPa, to reduce the probability of the ink layer 20 departing from the bending part 13, to improve the production yield.

In some embodiments, the viscosity of the ink layer 20 is $\mu$, where 10 cp≤$\mu$≤25 cp. For example, the viscosity $\mu$ of the ink layer 20 is one of 10 cp, 15 cp, 20 cp, and 25 cp.

If the viscosity $\mu$ of the ink layer 20 is too small, the ink layer 20 is easily separated from an adjacent layer, resulting in display abnormalities or other issues, which is disadvantage to the long-term use of the display module. Therefore, the embodiment of the present disclosure configures the viscosity $\mu$ of the ink layer 20 to be not less than 10 cp, and the ink layer 20 can bond tightly with adjacent layers to improve the reliability of the display module.

During the transition from the flattened state to the bent state, different layers have different deformation amounts due to their different positions. At this point, if the viscosity $\mu$ of the ink layer 20 is too large, during the bending process, the ink layer 20 may pull the adjacent layers to generate excessive deformation, resulting in structural abnormalities in the adjacent layers. Therefore, the embodiment of the present disclosure configures the viscosity $\mu$ of the ink layer 20 to be no more than 25 cp to reduce the risk of abnormalities in the display module during bending.

Figure 25:
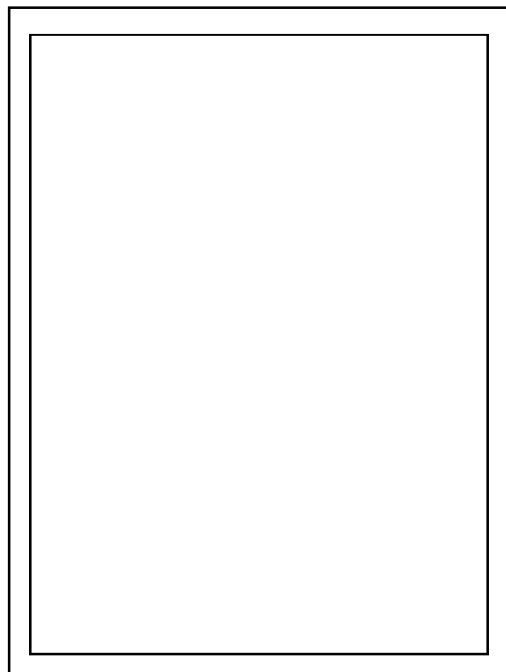
FIG. 25 is a structural schematic diagram of a display device according to an embodiment of the present disclosure.

In one embodiments of the present disclosure, referring to FIG. 25, a display device is provided, including the display module in any of the aforementioned embodiments. The display device includes but not limited to a mobile phone, a computer screen, and a car display.

It should be noted that the display module mentioned in the embodiment of the present disclosure refers to the display module in the bent state. The display device according to the embodiment of the present disclosure has the same beneficial effect as the display module in any of the aforementioned embodiments, for details of which, reference can be made to the above description of the display module.

Figure 26:
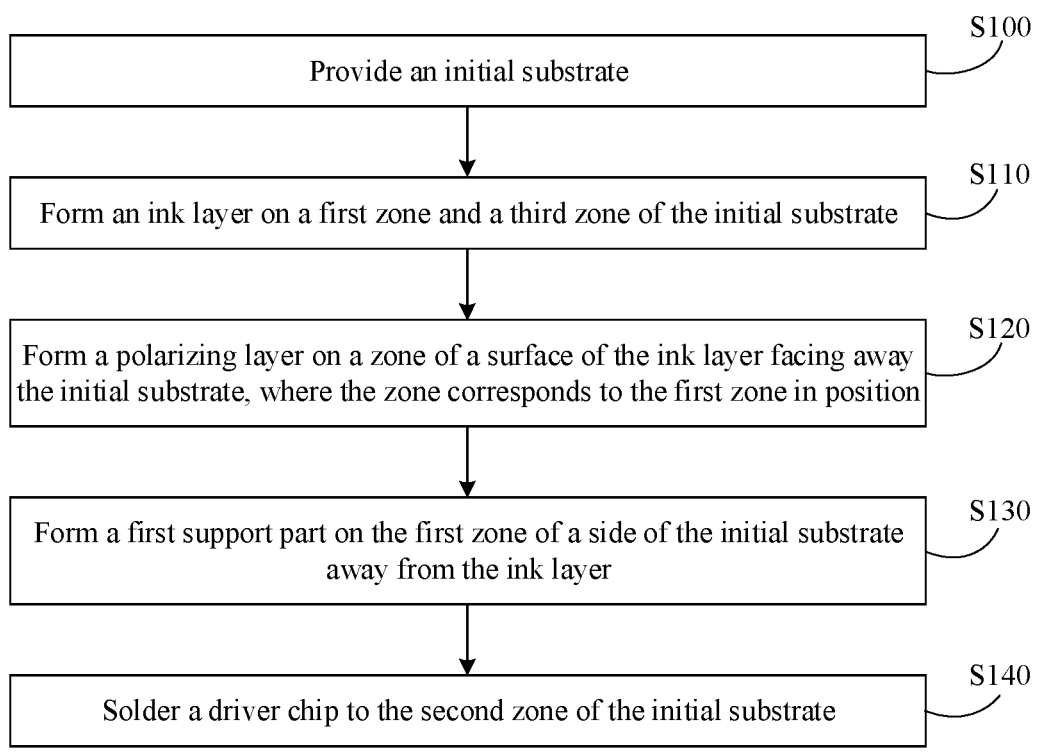
FIG. 26 is a flowchart of a method for producing a display module according to an embodiment of the present disclosure.
Figure 27A:
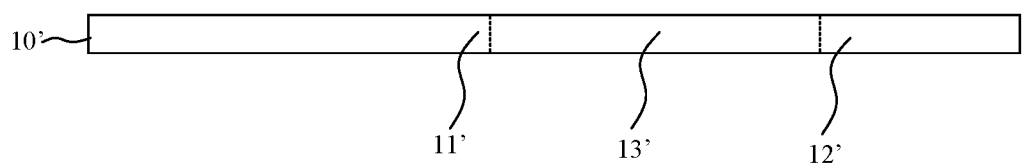
FIGS. 27a to 27e show structures produced in a method for producing a display module according to an embodiment of the present disclosure.
Figure 27B:
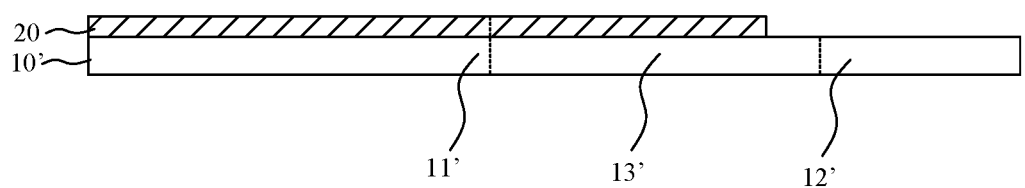
Figure 27C:
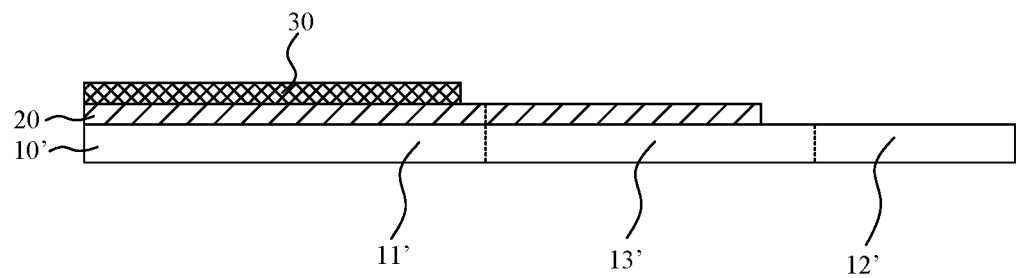
Figure 27D:
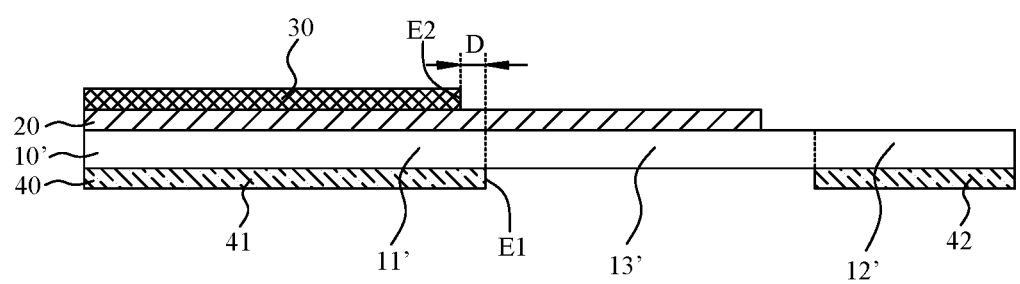
Figure 27E:
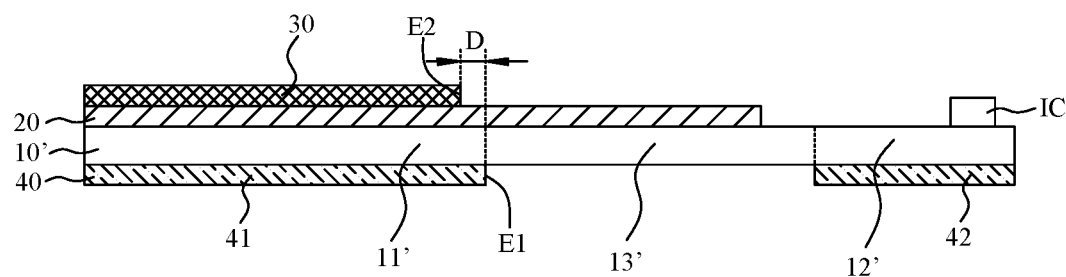

In one embodiments of the present disclosure, referring to FIGS. 26 to 27e, a method for producing a display module is provided, including steps S100 to S140.

In step S100, an initial substrate is provided.

Referring to FIG. 27a, in step S100, the initial substrate 10' includes a first zone 11', a third zone 13', and a second zone 12' arranged side by side in a first direction X. The initial substrate 10' corresponds to the display panel in the flattened state. The first zone 11' of the initial substrate 10' is the first part of the display panel, the second zone 12' of the initial substrate 10' is the second part of the display panel, and the third zone 13' of the initial substrate 10' is the bending part of the display panel.

In step S110, an ink layer is formed on the first zone and the third zone of the initial substrate.

Referring to FIG. 27b, in step S110, the ink layer 20 is formed on both the first zone 11' and the third zone 13'. The embodiment of the present disclosure does not limit the forming method of the ink layer 20. For example, the ink layer 20 may be formed by printing with a micro nozzle, which can have high preparation accuracy. Furthermore, the thickness of the ink layer 20 on the first zone 11' and the third zone 13' can be adjusted appropriately, in order to meet the bending requirements and the protection requirements of the display module.

It should be noted that in addition to forming the ink layer 20 on the first zone 11' and the third zone 13', the ink layer 20 may further be formed on the second zone 12', that is, the ink layer 20 extends from the first zone 11' to the second zone 12' through the third zone 13'.

In step S120, a polarizing layer is formed on the ink layer on the first zone of the initial substrate.

Referring to FIG. 27c, in step S120, the polarizing layer 30 is formed on the ink layer 20. The probability of the material of the ink layer 20 transferring to the side of the polarizing layer 30 away from the display panel 10 is low. Therefore, the ink layer 20 has little impact on the polarizing layer 30 and has no adverse impact on the subsequent producing processes, which improves the production yield of the display module.

In addition, the presence of the ink layer 20 can ensure that the film structure where the polarizing layer 30 is located is relatively flat, to reduce the risk of cracks in the polarizing layer 30 and improving the production yield of the polarizing layer 30.

In step S130, a first support part is formed on the first zone of the initial substrate, where the first support part is on the side of the initial substrate away from the ink layer.

Referring to FIG. 27d, in step S130, the polarizing layer 30 and the first support part 41 are respectively formed on two opposite sides of the initial substrate 10'. The first support part 41 has a first edge E1 on the side close to the third zone 13' in the first direction X, the polarizing layer 30 has a second edge E2 on the side close to the third zone 13' in the first direction X, and the distance between the first edge E1 and the second edge E2 in the first direction X is D, where D≤0.3 mm.

Figure 28:
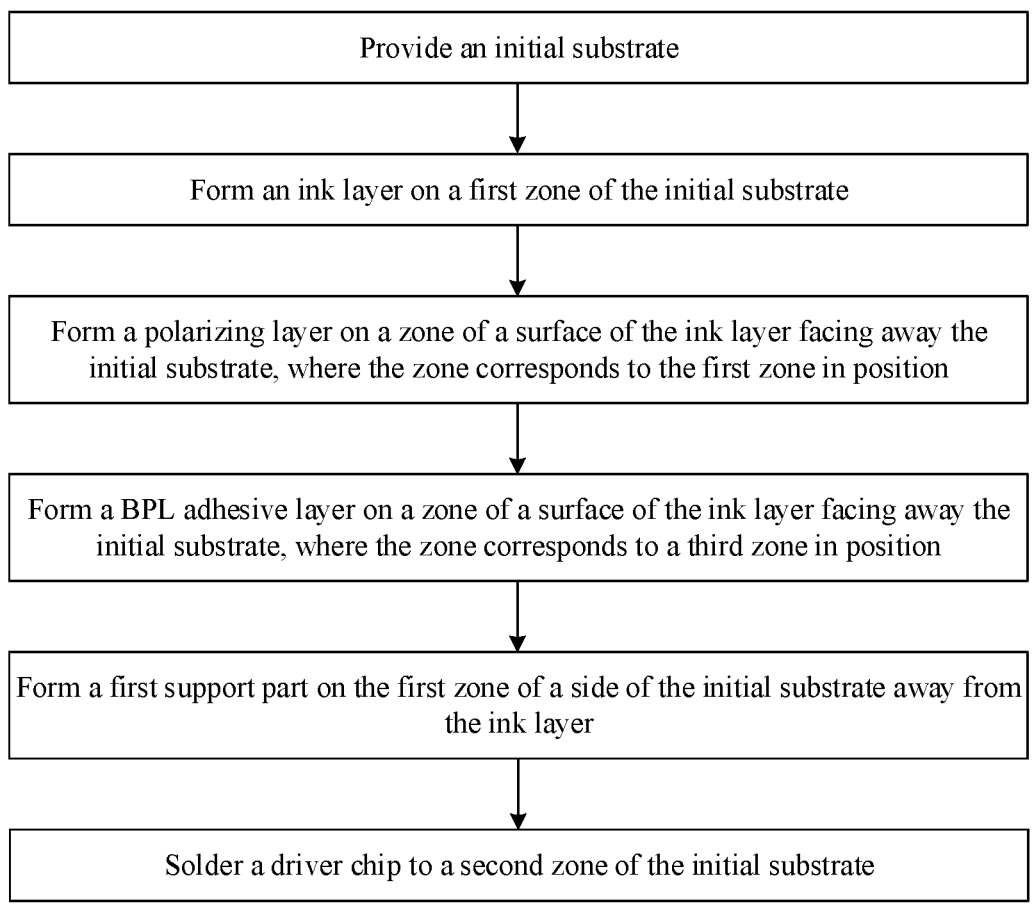
FIG. 28 is a flowchart of a method for producing a display module in related technologies.

Referring to FIGS. 26 and 28, in the embodiment of the present disclosure, as the ink layer 20 extends to the third zone 13', compared to related technologies, no BPL adhesive needs to be provided on the third zone 13' and no additional process is added, simplifying the producing process, and saving the waiting time after the completion of BPL adhesive preparation. Generally, after the completion of BPL adhesive preparation, it needs to wait for seven days before proceeding to the next process. Therefore, the embodiment of the present disclosure can further reduce the production time of the display module and improve production efficiency.

In addition, since the BPL adhesive preparation is cancelled, there is no need to set a large distance between the first edge E1 and the second edge E2 in the first direction X to ensure the detection accuracy of the BPL adhesive. Therefore, the distance D between the first edge E1 and the second edge E2 in the first direction X can be reduced to no more than 3 µm, achieving a narrow border effect.

It should be noted that step S130 can be performed after step S120, before step S120, or before step S110, which is not limited in the embodiments of the present disclosure.

In step S140, a driver chip is soldered to the second zone of the initial substrate.

Referring to FIG. 27e, in step S140, the installation of the driver chip IC is performed after the polarizer preparation process, that is, step S140 is performed after step S120. There is no step of preparing BPL adhesive between steps S140 and S120, which can reduce the preparation steps and improve production efficiency.

It should be noted that the embodiments of the present disclosure only include a partial preparation process of the display module, and there may be other steps between the above adjacent steps, and other steps may be performed after step S140, such as packaging and cutting, which are not limited in embodiments of the present disclosure.

Although the disclosed embodiments of the present disclosure are described above, the present disclosure is only for the purpose of better understanding of the present disclosure and is not intended to limit the present disclosure. Modifications and changes in the embodiments without departing from the spirit and scope in the present disclosure. The scope of protection of the present disclosure shall be subject to the scope defined in the attached claims.

What is claimed is:

1. A display module, comprising:
   a display panel, comprising a first part, a second part and a bending part connected between the first part and the second part, wherein the bending part is bendable to bring the second part to a side of the first part in a thickness direction; and
   an ink layer arranged on a side of the display panel, wherein the ink layer covers at least a portion of the first part and at least a portion of the bending part;
   wherein the ink layer comprises a first ink part on the first part and second ink part arranged on the bending part, an average thickness of the second ink part is less than an average thickness of the first ink part, and
   in a direction from the first part to the second part, a thickness of the second ink part is first gradually decreased and then gradually increased or the thickness of the second ink part is first gradually increased and then gradually decreased.

2. The display module according to claim 1, wherein the second ink part comprises a first surface facing away the bending part, and the first surface is an arc-shaped surface recessed towards the bending part.

3. The display module according to claim 1, wherein the ink layer further comprises a third ink part arranged on the second part;
   a thickness of the second ink part at a position where the second ink part is connected to the first ink part is the same as a thickness of the second ink part at a position where the second ink part is connected to the third ink part.

4. The display module according to claim 1, wherein the second ink part comprises a first surface facing away the bending part, and the first surface is an arc-shaped surface protruding away from the bending part.

5. The display module according to claim 1, wherein at least thickness of the second ink part is H1, a greatest thickness of the second ink part is H2, where H2≥H1+5 µm.

6. The display module according to claim 1, wherein a thickness of the ink layer is W, where 5 µm≤W≤30 µm.

7. The display module according to claim 1, wherein an elastic modulus of the ink layer is E, where 0.1 GPa≤E≤10 GPa.

8. A display device, comprising a display module, wherein the display module comprises:
   a display panel, comprising a first part, a second part and a bending part connected between the first part and the second part, wherein the bending part is bendable to bring the second part to a side of the first part in a thickness direction; and
   an ink layer arranged on a side of the display panel, wherein the ink layer covers at least a portion of the first part and at least a portion of the bending part;
   wherein the ink layer comprises a first ink part arranged on the first part and a second ink part arranged on the bending part, an average thickness of the second ink part is less than an average thickness of the first ink part, and
   in a direction from the first part to the second part, a thickness of the second ink part is first gradually decreased and then gradually increased or the thickness of the second ink part is first gradually increased and then gradually decreased.

\* \* \* \* \*